United States Patent
Gupta et al.

(10) Patent No.: US 11,411,952 B2
(45) Date of Patent: Aug. 9, 2022

(54) SYSTEMS AND METHODS FOR MULTI-LEVEL AUTHENTICATION

(71) Applicant: Verizon Patent and Licensing Inc., Arlington, VA (US)

(72) Inventors: Umesh Kumar Gupta, Morris Plains, NJ (US); Bharadwaj Vemuri, Bear, DE (US); Binaben Dipesh Patel, Franklin Park, NJ (US); Masudur Rahman, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 322 days.

(21) Appl. No.: 16/838,187

(22) Filed: Apr. 2, 2020

(65) Prior Publication Data

US 2021/0314318 A1 Oct. 7, 2021

(51) Int. Cl.
*H04L 29/06* (2006.01)
*H04L 9/40* (2022.01)

(52) U.S. Cl.
CPC ...... *H04L 63/0876* (2013.01); *H04L 63/0442* (2013.01); *H04L 63/083* (2013.01); *H04L 63/0861* (2013.01); *H04L 63/105* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 5,898,780 A * | 4/1999 | Liu | G06Q 30/0645 705/18 |
| 7,715,565 B2 * | 5/2010 | Kimmel | H04L 63/065 380/278 |
| 10,924,469 B2 * | 2/2021 | Fletcher | H04L 67/10 |
| 2009/0216842 A1 * | 8/2009 | Risher | H04L 51/12 709/206 |
| 2010/0299716 A1 * | 11/2010 | Rouskov | H04L 63/105 726/1 |
| 2014/0095874 A1 * | 4/2014 | Desai | H04L 63/0815 713/168 |

(Continued)

OTHER PUBLICATIONS

Author unknown, ITU-T Telecommunication Standardization Sector of ITU, X.1277 , "Universal authentication framework", Series X: Data Networks, Open System Communicationsand Security, Cyberspace security—Identity management (Year: 2018).*

(Continued)

*Primary Examiner* — Piotr Poltorak

(57) ABSTRACT

A system described herein may provide for multiple levels of authentication, such that a User Equipment ("UE") may receive secure content from an application server, which may include or may be implemented by a multi-access edge computing ("MEC") system. As described herein, a user associated with a UE may register the UE and/or a particular application with an authentication system and/or the application server. The registration of the UE and/or the application may establish a "trust" relationship between the authentication system and the UE, such that a user-level authentication performed by the UE, such as biometric authentication, may be accepted by the authentication system and/or the application system as an authentication of the user.

20 Claims, 8 Drawing Sheets

(56) References Cited

U.S. PATENT DOCUMENTS

| | | | |
|---|---|---|---|
| 2014/0317692 A1* | 10/2014 | Somekawa | G06F 21/31 726/4 |
| 2014/0358713 A1* | 12/2014 | Prakash | G06Q 30/06 705/26.3 |
| 2015/0029532 A1* | 1/2015 | Lee | H04W 12/068 358/1.14 |
| 2016/0057620 A1* | 2/2016 | Gray | H04W 4/60 455/411 |
| 2016/0323108 A1* | 11/2016 | Bhogal | H04W 12/08 |
| 2016/0337385 A1* | 11/2016 | Fujishima | H04L 63/1425 |
| 2017/0013462 A1* | 1/2017 | Jangi | H04W 12/062 |
| 2017/0060730 A1* | 3/2017 | Li | G06Q 10/06395 |
| 2017/0093829 A1* | 3/2017 | Gitlin | H04L 63/08 |
| 2017/0208461 A1* | 7/2017 | Yin | H04L 12/1403 |
| 2017/0230187 A1* | 8/2017 | Li | H04L 9/3231 |
| 2017/0244688 A1* | 8/2017 | Kim | G06F 21/6218 |
| 2017/0289133 A1* | 10/2017 | Yang | G06F 21/41 |
| 2018/0124049 A1* | 5/2018 | Lu | H04L 63/0876 |
| 2019/0313255 A1* | 10/2019 | Ogita | H04W 12/73 |
| 2019/0371442 A1* | 12/2019 | Schoenberg | H04L 63/105 |
| 2019/0394187 A1* | 12/2019 | Fletcher | H04L 9/3213 |
| 2020/0097162 A1* | 3/2020 | Hayashi | G06F 3/14 |
| 2020/0162447 A1* | 5/2020 | Fletcher | H04L 63/107 |
| 2020/0228516 A1* | 7/2020 | Kharidehal | H04L 63/083 |
| 2021/0117566 A1* | 4/2021 | Kajava | H04L 9/3234 |
| 2021/0234857 A1* | 7/2021 | Nakagawa | G06F 21/44 |

OTHER PUBLICATIONS

R. Lindemann et al., "FIDO AppID and Facet Specification v1.0," Oct. 9, 2014 (available at https://fidoalliance.org/specs/fido-u2f-v1.0-ps-20141009/fido-appid-and-facets-v1.0-ps-20141009.html, visited Jan. 17, 2020).

R. Lindemann et al., "FIDO AppID and Facet Specification v2.0," Feb. 27, 2018 (available at https://fidoalliance.org/specs/fido-v2.0-id-20180227/fido-appid-and-facets-v2 0-id-20180227.html, visited Apr. 2, 2020).

* cited by examiner

SYSTEMS AND METHODS FOR MULTI-LEVEL AUTHENTICATION

BACKGROUND

Wireless user equipment ("UE"), such as mobile telephones or other wireless communication devices, may utilize Multi-access Edge Computing ("MEC") devices to "stream" applications. For example, a UE may run a relatively lightweight operating system, while a MEC device may perform intensive computations and/or processing, and provide the results of such computing or processing to the UE, thus generating a "streaming" experience for applications.

DETAILED DESCRIPTION OF THE PREFERRED EMBODIMENTS

Figure 1:
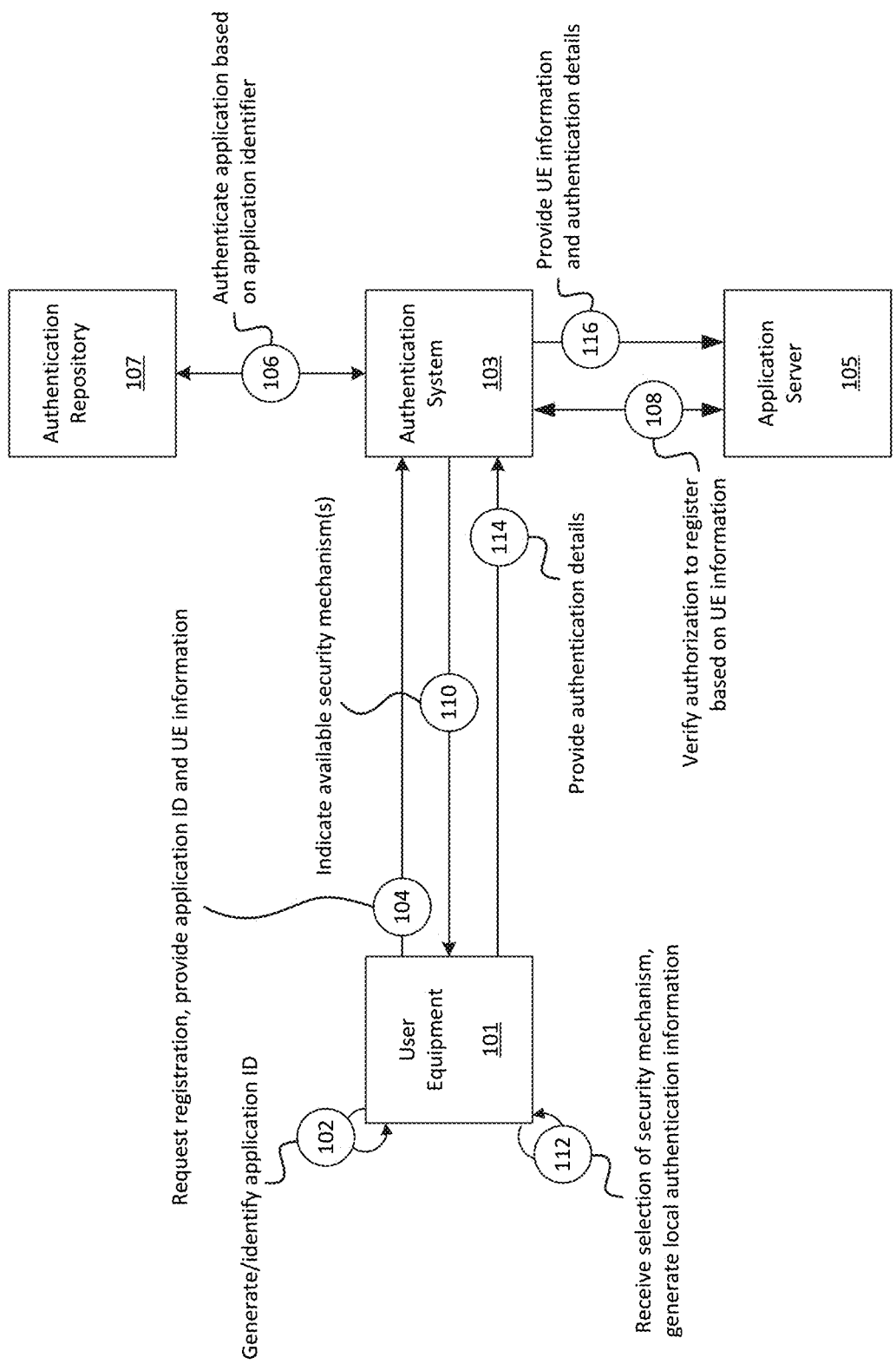
FIG. 1 illustrates an example registration of a UE for an enhanced authentication process, in accordance with embodiments described herein, in which multiple levels of authentication may be used to authenticate a user.

The following detailed description refers to the accompanying drawings. The same reference numbers in different drawings may identify the same or similar elements.

Embodiments described herein provide for the registration and utilization of User Equipment ("UE")-implemented security mechanisms, such as Personal Identification Numbers ("PINs"), username and password combinations, biometrics (e.g., fingerprints, facial recognition, or the like), and/or other security mechanisms, for authentication of a user with respect to access elements of a Virtual Operating System ("VOS") and/or one or more instances of applications operating within a VOS.

As discussed herein, a VOS may be implemented by a distributed or "cloud" computing system, such as a multi-access edge computing ("MEC") system associated with a wireless telecommunications network. Such a system (e.g., a cloud computing system, such as a MEC system) allows for the "streaming" of information relating to a VOS and/or instances of applications to a UE by performing computations relating to the VOS and/or the applications, and providing information that facilitates the input and/or output of information relating to the VOS and/or the applications by the UE. MEC devices may be deployed on "edges" of a wireless network to provide processing power for UEs that are geographically proximate to the edges, such that these UEs may utilize relatively lightweight local resources to present relatively complex application content. While discussed in the content of "applications" herein, similar concepts may apply to a VOS or other remote content (e.g., Internet- or web-accessible content).

As discussed herein, multiple different levels or types of authentication may be performed before secure content can be delivered to a given UE. For example, as discussed herein, an enhanced authentication process may include authentication of a given user (referred to as "user-level authentication"), authentication of a particular UE that is used to access the content (referred to as "device-level authentication"), and/or authentication of a particular application executing on the UE that is used to access the content. In some embodiments, the authentication of the user may be initiated by, and/or indicated to, an application that is remote from the UE (e.g., an application executing on a MEC system, a VOS, etc.), which may be referred to as "application-level authentication."

As discussed herein, user-level authentication may include utilizing an authentication system, such as a Fast Identity Online ("FIDO") protocol, to authenticate a user of the UE. Features associated with the FIDO protocol (and/or some other suitable protocol or technique) may be used to securely authenticate and register the user of the UE using security mechanisms implemented or supported by the UE, such as fingerprint identification, facial recognition, voice recognition, a Personal Identification Number ("PIN"), username and password combination, and/or other security mechanisms. As discussed herein, the UE may locally encrypt and store information related to such security mechanisms in order to perform user-level authentication when requesting secure content. This locally stored information may include a public/private key pair, where the private key remains on the UE and the public key may be provided to other devices.

In some embodiments, user-level authentication may be performed using some other suitable technique in addition to, or in lieu of, a FIDO-based technique and/or a public/private key pair technique. For example, a UE may authenticate a user (e.g., using a biometric security mechanism and/or some other security mechanism) and maintain a token and/or other indicator of authentication. In some embodiments, the token may be used in conjunction with other security mechanisms, such as a one-time use restriction (e.g., where the token is invalidated after being used once), a time restriction (e.g., where the token is invalid after a given time), or the like. For the sake of example, embodiments described herein are described in the context of public/private key pairs used for user-level authentication. In practice, other types of techniques may be used to indicate that a user has been authenticated by a UE.

As further discussed herein, device-level authentication according to some embodiments may include registering an identifier of a UE (e.g., a International Mobile Subscriber Identity ("IMSI"), International Mobile Station Equipment Identity ("IMEI"), Mobile Directory Number ("MDN"), and/or other suitable identifier). This identifier may be used by an application server (e.g., which provides secure content) and/or by an authentication system in accordance with some embodiments to verify that a UE, via which secure content is requested, is an authorized UE.

In some embodiments, an application may be verified or validated by registering an identifier, signature, etc., associated with a particular application that is used to request or access secure content. This signature may include, or may be based on, a unique identifier associated with the application, an application name, and/or some other suitable identifier of the application. In some embodiments, the signature may include a value derived from a unique identifier associated with the application, an application name, and/or some other value. In some embodiments, the signature may include, or may be based on, a FacetID. In some embodiments, the signature may be independent of the particular UE on which the application is installed. That is, in some embodiments, different instances of the same application, installed on different UEs, may have the same signature.

As described herein, application-level authentication may include indicating, to an application (e.g., an application executing remotely from the UE, such as an application executing at a MEC, a cloud computing system, a VOS, etc.) that a user has been authenticated (e.g., based on biometrics, PIN-based authentication, username and password, and/or some other suitable mechanism). In this manner, the application may provide secure content to the user, using UE-implemented security mechanisms (e.g., biometrics, PIN-based authentication, etc.).

In some embodiments, once the user-level and device-level authentication have been performed, an application server may perform or request application-level authentication, in which the UE may authenticate the user using a given security mechanism. Once the application-level authentication has been performed (e.g., the identity of the user has been verified by the UE and the application server has been notified of the verification), the application server may provide secure content to the UE (e.g., to a lightweight or "thin" client executing at the UE, associated with the application server). As referred to above, the secure content may include content related to a VOS and/or operations performed by a MEC system or other cloud computing system. In this manner, complex computing operations may be offloaded from the UE to a MEC (and/or some other suitable system), while utilizing device-implemented user authentication mechanisms, such as facial recognition, fingerprint verification, or the like.

For example, as shown in FIG. 1, UE 101 may generate (at 102) or identify an application identifier associated with a particular application operating on UE 101. As discussed above, this application may be a client portion of an application that presents content related to operations or calculations that are performed remotely, such as by an application server, a MEC system, or some other suitable cloud computing environment. As discussed herein, such operations are described as being performed by an "application server" (e.g., Application Server 105) for brevity. However, references to "Application Server 105" may include MEC systems or devices and/or some other suitable remote device or system that provides secure content to UE 101. The application may be a client application, such as a lightweight client, a thin client, etc., that presents secure content provided by Application Server 105. The content may be related to, for example, a banking application executed by Application Server 105, an e-mail application executed by Application Server 105, etc.

In some embodiments, Application Server 105 may provide (e.g., "stream") information to UE 101 for presentation, where Application Server 105 performs computations related to the input and/or output for the application for presentation via UE 101. That is, the application executing on UE 101 may provide output related to content provided by Application Server 105, may receive input (e.g., from a user of UE 101), and may provide some or all of the input to Application Server 105, which may process or handle the input and provide further content to the application based on the processed input. The application identifier may be, or may include, an application signature, a package identifier, a FacetID, a Universally Unique Identifier ("UUID"), and/or another application identifier.

UE 101 may request (at 104) registration of the application for an enhanced authentication procedure in accordance with some embodiments described herein. As a part of the request for the application registration, UE 101 may provide the application identifier (e.g., as similarly discussed above) to Application Server 105, which may verify the identity or integrity of the application based on the application identifier. For example, if the application identifier (provided at 104 by UE 101) matches an application identifier stored by Application Server 105, then Application Server 105 may verify that the application is valid, and further operations described herein may be permitted to proceed. If, on the other hand, the application identifier (provided at 104) does not match the application identifier stored by Application Server 105, then Application Server 105 may deny or ignore the request.

UE information, included in the registration request (at 104), may include information regarding UE 101 such as device attribute information (e.g., make and/or model, an operating system ("OS") type or version, screen size, and/or other attributes), network connectivity information (e.g., connectivity to a particular wireless telecommunications network, local area network ("LAN"), etc.), a device identifier (e.g., an IMEI, IMSI, etc.), and/or other information regarding UE 101. As described below, some information may be obtained via a device-level authentication procedure. Application information, which may also be included in the registration request, may include the application identifier (e.g., as determined in 102) and/or other information regarding the application, such as a version number, release date, and/or other information.

As further illustrated in FIG. 1, Authentication System 103 may authenticate (at 106) the application, which may include communicating with Authentication Repository 107 to determine whether the application is authorized to authenticate utilizing the enhanced authentication technique. The determination may, in some embodiments, be based on the application identifier (received at 104). For example, Authentication Repository 107 may maintain or provide a list of applications (e.g., application identifiers) authorized to utilize the enhanced authentication process of some embodiments. This list of applications may be maintained based on, for example, registration of particular applications or application identifiers with Authentication Repository 107. Authentication System 103 and/or Authentication Repository 107 may compare the application identifier (received at 104) to the application identifiers maintained or provided by Authentication Repository 107 to determine whether the application is authorized to utilize the enhanced authentication processes described herein.

In some embodiments, Authentication Repository 107 may further maintain information indicating permitted, preferred, or non-permitted security mechanisms associated with each application. In some embodiments, different applications and/or Application Servers 105 may be associated with different security mechanisms, and/or the same application or Application Server 105 may be associated with different security mechanisms for different users or UEs 101. For example, an application with relatively sensitive data may be associated with a requirement for a biometric-based security mechanism (e.g., fingerprint, facial recognition, etc.), and may not allow non-biometric-based security mechanisms, such as username and password combinations, PINs, etc.

In some embodiments, applications may utilize several security mechanisms, but one or more security mechanism types may be "preferred" over others. A security mechanism may, in some embodiments, be indicated as "preferred" based on the level of security associated with the security mechanism, and/or based on some other criteria. For example, a fingerprint-based security mechanism may provide a more secure level of authentication than a PIN-based security mechanism, etc., and thus may be indicated as "preferred" over the PIN-based security mechanism. In some embodiments, preferred security mechanisms may be associated with different levels of access to content than non-preferred security mechanisms. For example, a client-side banking application, executing on UE 101, may receive (e.g., from Application Server 105, which may implement server-side functionality of the banking application) information regarding recent transactions and account balances when a user authenticates via a PIN, while when using a biometric-based security mechanism (e.g., fingerprint or facial recognition) Application Server 105 may provide an option initiate a balance transfer, in addition to providing the information regarding recent transactions and account balances.

As further illustrated in FIG. 1, Authentication System 103 may verify (at 108) authorization of UE 101 to communicate with Application Server 105. For instance, in some embodiments, Authentication System 103 may provide (at 108) information associated with UE 101, which may determine whether UE 101 is authorized to communicate with Application Server 105. For example, Application Server 105 may not permit UE 101 to register to utilize the enhanced authentication process if the OS version is out of date. As another example, Application Server 105 may not permit UE 101 to register for the enhanced authentication process if capabilities of UE 101 do not meet required capabilities to implement allowed or preferred security mechanisms. For example, if Application Server 105 requires biometric authentication mechanisms and UE 101 does not have associated with hardware to implement a biometric authentication mechanism (e.g., does not have facial recognition or fingerprint scanning capabilities, which may be determined based on provided UE information), then Application Server 105 may reject the registration of UE 101. When rejecting a registration request, Application Server 105 may output (at 108) an indication that the request for registration was denied, and may indicate the reason(s) for the denial. Authentication System 103 may notify UE 101 of such reasons, which may present the reasons for a user of UE 101.

Once Application Server 105 authenticates or verifies (at 108) the request associated with UE 101, Authentication System 103 may provide (at 110) an indication to UE 101 that UE 101, and/or the particular application, has been verified for the enhanced authentication process. In some embodiments, the indication may indicate the permitted and/or preferred security mechanism(s) (e.g., as received at 106 and/or 108).

As illustrated in FIG. 1, UE 101 may receive (at 112) a selection of a particular security mechanism. In some situations, UE 101 may not implement, or have the capability to implement, one or more of the security mechanisms indicated (at 110) by Authentication System 103. For example, assume that Authentication System 103 indicates that a fingerprint-based security mechanism is permitted for use with the particular application, but that UE 101 does not have the capability of utilizing a fingerprint scan as a security mechanism (e.g., does not have a fingerprint scanner). In such an instance, UE 101 may analyze the indicated security mechanisms, determine which ones are implemented by or are available to UE 101, and may present only the options that are implemented by and/or available to UE 101. In this manner, the indication (at 110) may indicate a full list of permissible or preferred authentication mechanisms, from which UE 101 may further analyze to determine the options to present for selection and/or ultimately select.

Once UE 101 determines which security mechanisms may be used, UE 101 may present the available security mechanisms. For example, UE 101 may present a graphical list of available security mechanisms on a user interface. In such instances, UE 101 may indicate which security mechanism(s), if any, are preferred. For example, UE 101 may display a notification that a particular security mechanism is preferred (e.g., by pre-selecting a preferred security mechanism while presenting other security mechanism(s), by providing a textual and/or graphical indication that a particular security mechanism is preferred, etc.).

Once UE 101 presents (e.g., displays) the available security mechanisms, UE 101 may receive (at 112) a selection (e.g., a selection by a user) of one or more particular security mechanisms to utilize. UE 101 may further generate local authentication information based on the selected one or more security mechanisms. For example, in the case where the selected security mechanisms include a fingerprint scan, UE 101 may perform a fingerprint scan of the user and store information associated with the fingerprint scan (e.g., pattern recognition data used to establish or identify the fingerprint, etc.). In some embodiments, the local authentication information may be retrieved based on a prior establishment of the particular security mechanism. For instance, in the example of a fingerprint scan, the local authentication information may have been generated during an initial setup process where UE 101 received and maintained fingerprint data for future use.

Based on the received security mechanism selection and generating or retrieving the local authentication information, UE 101 may generate a set of keys associated with the selected security mechanism. In some embodiments, the set of keys may include a public/private key pair, including a public key and a private key. The private key may remain "local" to UE 101, in that the private key is not provided to another entity (e.g., Application Server 105 and/or Authentication System 103) as part of the enhanced authentication process described herein. The public key may be utilized by entities other than UE 101 (e.g., to encrypt a communication) and thus, the public key may be made accessible to devices and/or systems beyond UE 101, such as Application Server 105. In this manner, the public key may be used to generate a challenge string (e.g., by Application Server 105 and/or Authentication System 103), which UE 101 may encrypt and send back. When the encrypted challenge string is received from UE 101, this challenge string may be decrypted (e.g., by Application Server 105 and/or Authentication System 103), confirming that the authentication was done by UE 101.

In some embodiments, each security mechanism may be associated with a different set of keys. For example, a fingerprint-based security mechanism may be associated with a first set of authentication keys, while a username and password combination may be associated with a second set of authentication keys.

The authentication key pair may be utilized to encode and/or sign a challenge string. Generally, a challenge string may be a generated set of bits and/or alpha-numerical string containing a series of characters such as letters and numbers. Encoding may be utilized to securely communicate with a device by using a mathematical modulation algorithm based on the public key, which can only be decoded (e.g., via a mathematical demodulation algorithm) using the private key. For example, after a successful registration and authentication (as described in more detail below) via a particular security mechanism, Application Server 105 may encode a communication utilizing the public key associated with the particular security mechanism. Once UE 101 receives the communication, UE 101 may securely decode the communication using the private key. Because UE 101 holds the only copy of the private key, no other device may decrypt the message. As another example, as discussed herein, UE 105 may receive (e.g., from Authentication System 103) a challenge string and may encrypt the challenge string using the private key, and another device or system in possession of the public key (e.g., the same entity from which the challenge string was received, such as Authentication System 103) may authenticate UE 105 by decrypting the challenge string using the public key.

As further illustrated in FIG. 1, UE 101 may provide (at 114) authentication details to Authentication System 103. Authentication details may include, for example, information regarding the registration such as an identifier associated with the set of keys, a registered username associated with the registration, and/or other information. In some embodiments, UE 101 may provide (at 114) an application identifier associated with the particular application. As discussed below, this application identifier may be used (e.g., by Authentication System 103 and/or by Application Server 105) to determine which particular application the authentication details are associated, in the instance where UE 101 is registered to perform the enhanced authentication process described herein with multiple different applications.

In some embodiments, Authentication System 103 may provide (at 116) information regarding the registration to Application Server 105. Registration information may include, for example, UE information, application information (e.g., the application identifier), authentication details (e.g., selected security mechanism, etc.), and/or other information. Application Server 105 may store some or all of this information for future utilization, such as to perform a user-level authentication of a user associated with UE 101 and/or a device-level authentication of UE 101 itself.

Figure 2:
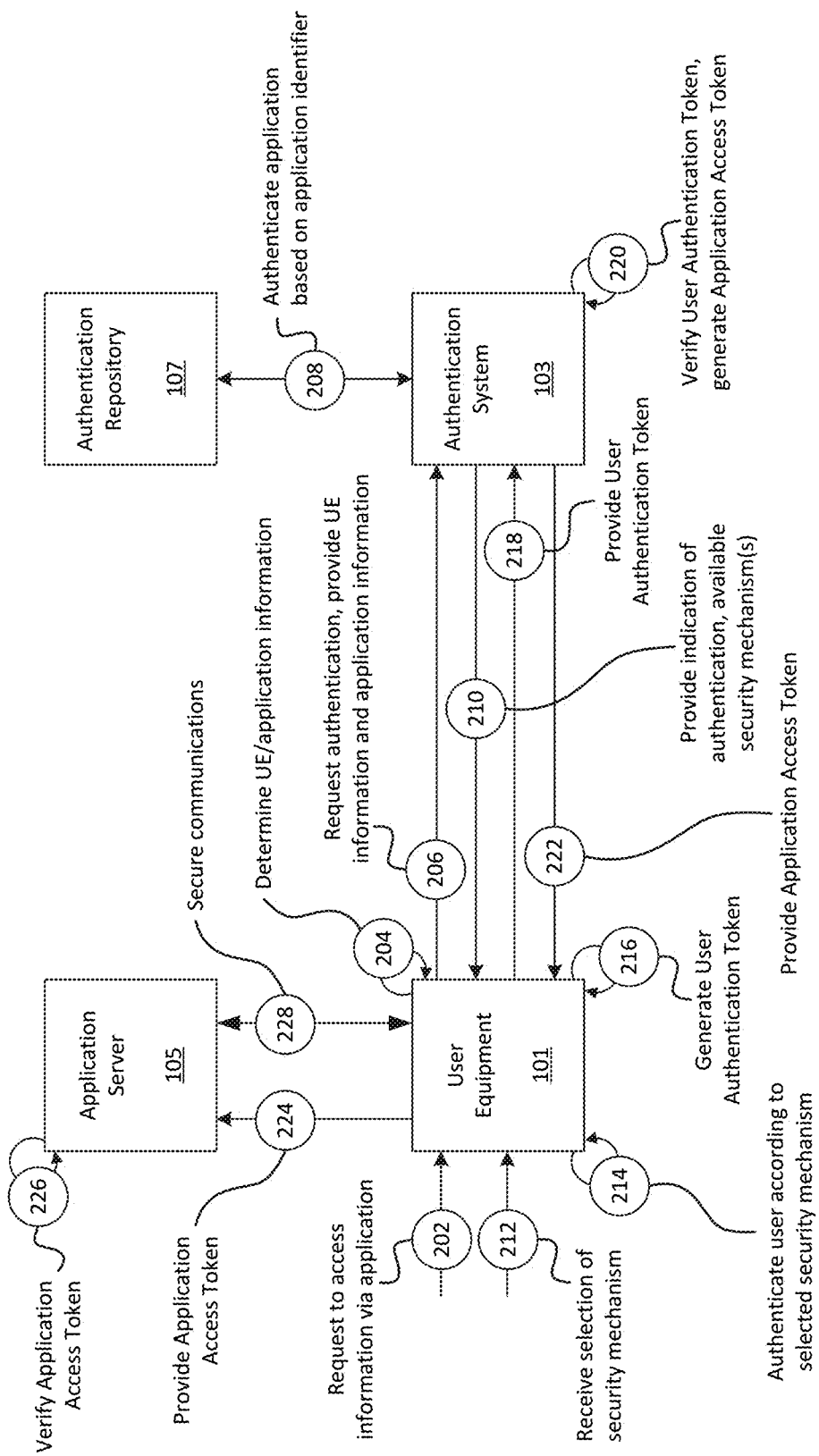
FIG. 2 illustrates an example overview of one or more embodiments described herein, in which a UE authenticates an application instance via a particular enhanced authentication process.

For example, as shown in FIG. 2, UE 101 may receive (at 202) a request to access information via an application (e.g., an application that was registered in accordance with process described above with respect to FIG. 1). In other words, UE 101 may receive a request (e.g., via a user input) to present information from Application Server 105. For example, UE 101 may execute a "lightweight" application, a client-side application, and/or some other application associated with an application (e.g., a server-side application, a virtual application, a cloud application, etc.) executed by Application Server 105. As discussed above, Application Server 105 may be, may include, and/or may be implemented by a MEC. Executing the application at UE 101 may include presenting a graphical user interface ("GUI") associated with, and/or otherwise provided by, Application Server 105. This GUI may include, and/or may be associated with, a login screen for access to information or services provided by Application Server 105.

Based on this request (received at 202), UE 101 may perform a device-level authentication process to authenticate UE 101, which may indicate to Application Server 105 (e.g., an application server or some other device or system with which UE 101 may communicate via the particular application) that UE 101 is authorized to access content associated with the particular application or Application Server 105. An example of device-level authentication is described below with respect to FIG. 3.

As further shown in FIG. 2, UE 101 may determine (at 204) UE and/or application information. As described above, UE information may include information such as an OS version, model number, UE 101 identifiers, and/or other attribute information associated with UE 101. Application information may include, an application identifier, version number, UUID, and/or other identifying information associated with the particular application.

Based on the determined UE and/or application information, UE 101 may output (at 206) an authentication request to Authentication System 103. In some embodiments, the request may be accompanied by information such as UE 101 information and/or application information (e.g., as determined at 204).

As further illustrated in FIG. 2, Authentication System 103 may authenticate (at 208) the application based on the application identifier. As discussed above, for example, Authentication System 103 may receive a list of authorized applications from Authentication Repository 107, and may compare the application identifier received (at 206) from UE 101 to the received list of authorized applications (e.g., from Authentication Repository 107) to determine whether the application is authorized. Authentication Repository 107 may, for example, maintain a list or other type of information indicating application identifiers of authorized applications. This list may have been generated based on registration processes associated with these applications, such as the authentication (at 106) described above with respect to FIG. 1. In some embodiments, Authentication Repository 107 may indicate permitted and/or preferred security mechanisms associated with the application.

Based on the authorization of the application (at 208), Authentication System 103 may provide (at 210) an indication to UE 101 that UE 101, and/or the particular application, has been verified as authorized to receive secure content. In some embodiments, the indication may further indicate permitted and/or preferred security mechanisms (e.g., received at 208). In some embodiments, in addition to, or in lieu of, providing (at 210) the indication to UE 101, Authentication System 103 may notify Application Server 105 that UE 101 has initiated an authentication request for access to content associated with Application Server 105, and/or may indicate the available security mechanisms (e.g., security mechanisms, implemented by UE 101, which have previously been registered, as discussed above). Application Server 105 may, in turn, indicate to UE 101 one or more particular security mechanisms that may be selected by UE 101. That is, in some instances, Application Server 105 may require different security mechanisms than those that have been previously registered as being associated with UE 101. In some embodiments, Application Server 105 may require multiple security mechanisms (e.g., both fingerprint and PIN), and may indicate (at 210) the multiple security mechanisms required.

As further shown, UE 101 may receive (at 212) a selection of a particular security mechanism. For example, UE 101 may present a security prompt, which may include selectable options associated with the permitted and/or preferred security mechanisms indicated by Authentication System 103 and/or by Application Server 105, as mentioned above. For example, if UE 101 previously registered to authenticate the application using either a PIN or a fingerprint, UE 101 may present an option for a user to select whether to provide the PIN or use the user's fingerprint. The presented security prompts may be in accordance with the one or more security mechanisms indicated as being permitted, preferred, etc. during the registration procedure (e.g., as discussed above). In some embodiments, preferred security mechanisms may be presented more prominently, using one or more techniques, such as highlighting the preferred security mechanism, increasing the font size for the preferred security mechanism (compared to other security mechanisms), placing the preferred security mechanism higher in the selection list, and/or other techniques.

In some embodiments, the indication (received at 210) may indicate a ranking of security mechanisms, based on which UE 101 may present (at 212) the security mechanisms. For instance, UE 101 may place a highest-ranked security mechanism in a highest position in a GUI, may place a second highest-ranked security mechanism in a position immediately below the highest-ranked security mechanism in the GUI, etc. In some embodiments, as mentioned above, multiple security mechanisms may be required. In such embodiments, the GUI may present the multiple required security mechanisms, along with an indication that multiple security mechanisms are required.

Once a particular security mechanism is selected (e.g., by a user of UE 101), UE 101 may authenticate (at 214) the user according to the selected security mechanism. For example, if UE 101 was registered with a fingerprint security mechanism, UE 101 may compare stored fingerprint information with the user's fingerprint information (received at 212). As another example, if UE 101 was registered utilizing a PIN-based security mechanism, UE 101 may compare the stored PIN with a received PIN. While brief examples are provided here of how UE 101 may authenticate the user based on a selected security mechanism, in practice, UE 101 may utilize more complex or different processes to authenticate the user in accordance with the selected security mechanism.

As further illustrated in FIG. 2, UE 101 may generate or receive (at 216) a User Authentication Token, indicating that the user was authenticated at UE 101 using the selected security mechanism. For example, in some embodiments, UE 101 may generate the User Authentication Token after performing a local user authentication process (e.g., based on the selected particular security mechanism(s)). In some embodiments, UE 101 may receive the User Authentication Token as part of an authentication process in which UE-implemented security mechanisms (e.g., biometrics, PIN-based authentication, etc.) are performed in conjunction with another device or system, such as a FIDO system. In some embodiments, the User Authentication Token may be generated using the public/private pair of authentication keys associated with the verified security mechanism to sign an indication that the user has been authenticated by UE 101 according to the selected authentication mechanism. As another example, the User Authentication Token may include a one-time code, a duration-limited code, and/or some other suitable type of token which may be used to verify the User Authentication Token.

UE 101 may provide (at 218) the User Authentication Token to Authentication System 103. For example, the User Authentication Token may indicate that the user has been authenticated by UE 101 (and/or has been authenticated in conjunction with one or more other devices or systems suitable to authenticate the user, such as a FIDO-based system). In some embodiments, UE 101 may further provide (at 218) an indication of the particular security mechanism utilized to authenticate on UE 101.

Authentication System 103 may verify (at 220) the User Authentication Token. For example, as described above, verification may include utilizing the public key associated with the authentication key pair and a signature verification algorithm to verify the User Authentication Token. Authentication System 103 may, for example, determine the public key to use based on a previously performed mapping of an identifier of UE 101 to one or more public/private key pairs associated with UE 101. As another example, Authentication System 103 may communicate with UE 101 and/or some other device or system to verify the User Authentication Token. For example, some other device or system may be used to verify a one-time or time-limited code included in the User Authentication Token, and/or some other suitable technique may be used to verify the authenticity of the User Authentication Token.

Based verifying (at 220) the User Authentication Token (e.g., that the user has been authenticated by UE 101), Authentication System 103 may output (at 222) an Application Access Token, indicating that the authentication of the user was verified. In some embodiments, the Application Access Token may include a JavaScript Object Notation Web Token ("JWT") or some other type of token. The Application Access Token may be signed by Authentication System 103 (e.g., signed using a private key associated with Authentication System 103) to indicate that the Authentication System 103 has determined that the authentication of UE 101 and/or of the user was successful. In some embodiments, the Application Access Token may include information, including the security mechanism utilized to authenticate the instance of the application. Upon receiving the Application Access Token from Authentication System 103, UE 101 may provide (at 224) the Application Access Token to Application Server 105.

Application Server 105 may verify (at 226) the Application Access Token, which may include utilizing a public key, of a public/private key pair associated with Authentication System 103, and a signature verification algorithm to determine the source of the Application Access Token. As indicated above, the Application Access Token may indicate the authentication of UE 101 and/or of the user was successful, and was verified by Authentication System 103.

As a result of verifying the Application Access Token, Application Server 105 and UE 101 may participate (at 228) in secure communications. For example, Application Server 105 may output secure content to UE 101 for presentation on UE 101. As briefly discussed above, in some embodiments, different security mechanisms may provide different levels of access to information, particularly in respect to preferred security mechanisms. Application Server 105 may determine the level of access based on the received Application Access Token, which may include an indication of the security mechanism utilized for authenticating the particular instance of the application. For example, a banking application provided by Application Server 105 may allow low-level access, such as a list of recent transactions or account balances, based on a PIN-based authentication, but may allow high-level access, such as conducting a series of transactions, based on a fingerprint-based authentication.

In some embodiments, Application Server 105 may stream information for presentation by UE 101 (e.g., in a MEC system). In some such embodiments, Application Server 105 may perform computations relating to the instance of the application and provide information facilitating the input and/or output of information relating to the instance of the application by UE 101.

Figure 3:
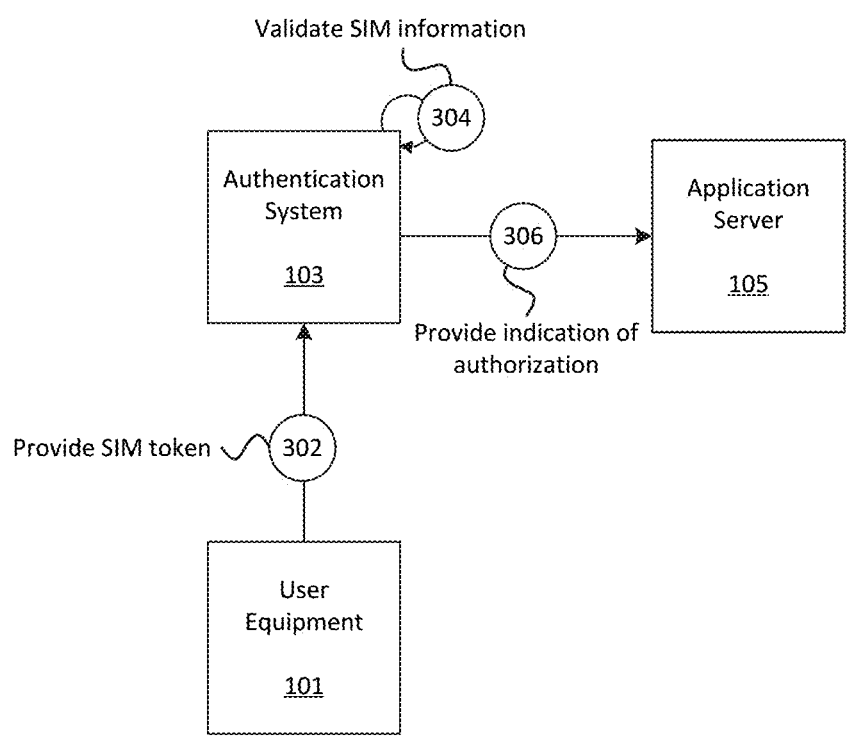
FIG. 3 illustrates an example authentication for device level access, in accordance with embodiments described herein.

As mentioned above, in some embodiments, a device-level authentication of UE 101 may serve to verify that UE 101 is the same device that has performed user-level and/or application-level authentication registration (e.g., as discussed above with respect to FIG. 1). For example, as shown in FIG. 3, for example, UE 101 may provide (at 302) UE-specific information, such as Subscriber Identity Module ("SIM") token information, to Authentication System 103. The SIM token may include and/or may be generated based on information specific to UE 101, such as a IMSI, IMEI, and/or other information. The SIM token may, in some embodiments, be generated by UE 101 (e.g., by a SIM "card," Universal Integrated Circuit Card ("UICC"), etc., associated with UE 101, or based on information received from a SIM card associated with UE 101). Authentication System 103 may further include one or more devices and/or systems which may be utilized to verify SIM information, corresponding subscriber information, and/or other information. For example, Authentication System 103 may be, or may be communicatively coupled with, an element of a core portion of a wireless telecommunications network.

Once receiving the information from UE 101 (at 302), Authentication System 103 may validate (at 304) the SIM information by comparing the received SIM information to a repository that maintains information regarding UEs 101. For example, Authentication System 103 may communicate with a Home Subscriber Server ("HSS"), a Unified Data Management function ("UDM"), and/or some other device or system that maintains information regarding UEs that are associated with (e.g., provisioned for) a given wireless telecommunications network, and/or UEs that are authorized to participate in the device-level, user-level, and application-level authentication processes described herein. Upon validating the received SIM information, Authentication System 103 may maintain an indication or flag that UE 101 has been verified, and/or that the SIM token has been verified. This indication or flag may include identifying information for UE 101 (e.g., IMSI, IMEI, MDN, etc.). During subsequent operations (e.g., during a registration operation as described above with respect to FIG. 1, and/or during an authentication operation as described above with respect to FIG. 2), Authentication System 103 may verify that the device-level authentication of UE 101 has been performed.

Authentication System 103 may, in some embodiments, further provide (at 306) an indication to Application Server 105 that UE 101 has been validated. In some embodiments, Application Server 105 may reject content requests from UEs for which Application Server 105 has not received such an indication.

Figure 4:
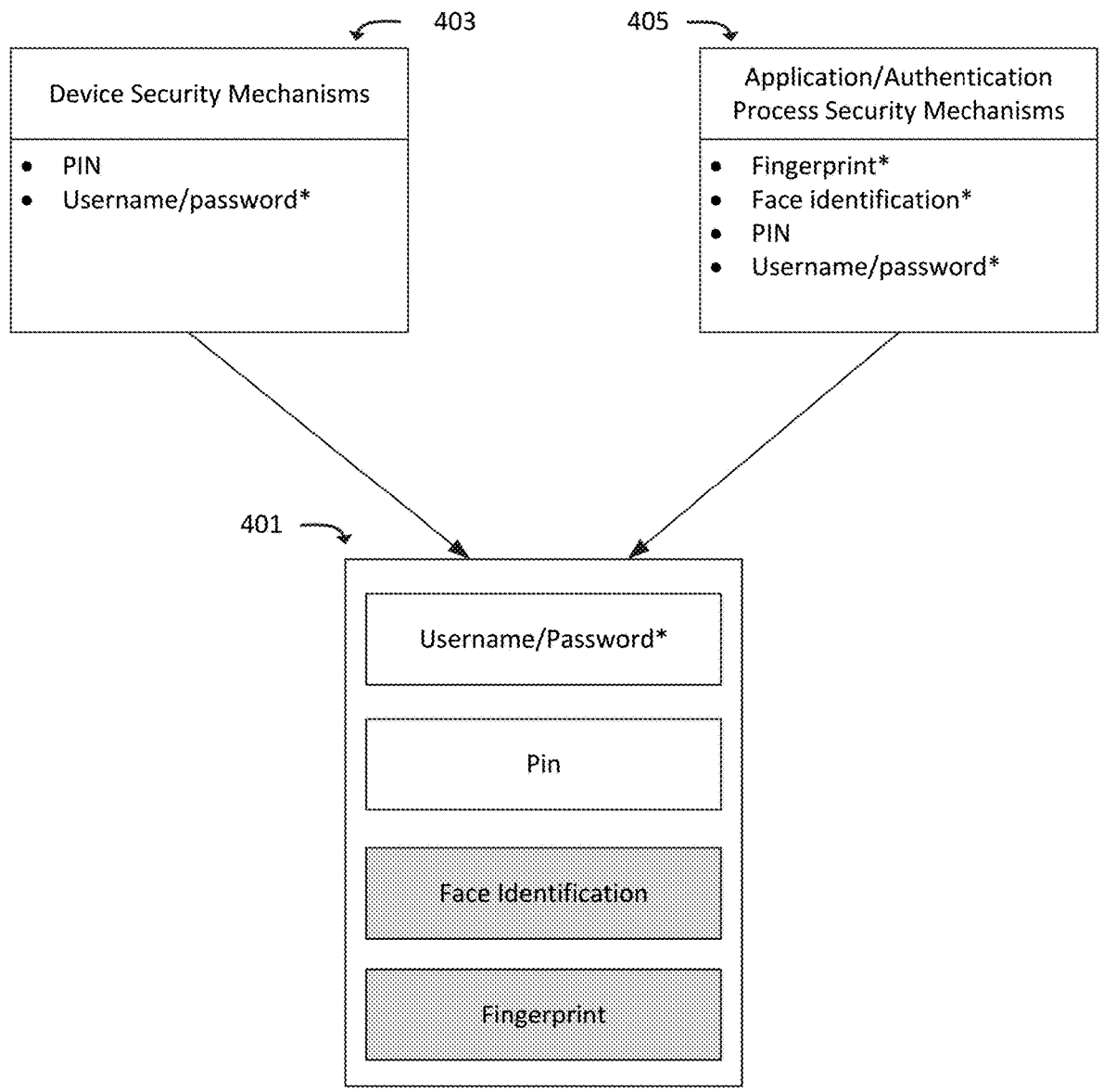
FIG. 4 illustrates an example selection of security mechanisms, in accordance with embodiments described herein.

FIG. 4 illustrates an example selection of a security mechanism, in accordance with embodiments described herein, where UE 101 may present several available security mechanisms via user interface 401. Data structure 403 may indicate, for example, which security mechanisms are available to, or implemented by, UE 101 (e.g., as described above in respect to FIG. 1, block 112). For example, as shown, UE 101 may implement a PIN and/or a username and password combination. In other words, in this example, UE 101 may not have additional security mechanisms available (e.g., no camera for facial recognition, no fingerprint reader, etc.). Data structure 405 may indicate the security mechanisms available for a particular application (e.g., as described above in respect to FIG. 1, block 106) and/or for a particular enhanced authentication process. For example, in this instance, the particular application may permit fingerprint, face identification, PIN, and/or username and password security mechanisms for registration to utilize the enhanced authentication process. As described above, in some embodiments, data structure 405 may indicate preferred security mechanism(s) for a particular application. As shown, several security mechanisms (fingerprint, face identification, and username and password combination) may be identified as preferred security mechanisms (as indicated by the "*" adjacent to each respective security mechanism).

UE 101 may compare the security mechanisms indicated by data structures 403 and 405 to determine which security mechanisms are authorized by the particular application and available on UE 101. As shown, UE 101 may present unavailable security mechanisms (e.g., as shown in FIG. 4 with a gray background) and available security mechanisms (e.g., as shown in FIG. 4 with a white background). In some embodiments, UE 101 may only present available security mechanisms (e.g., mechanisms implemented by UE 101 and indicated as authorized by the particular application). In some embodiments, UE 101 may more prominently present preferred security mechanism(s) than non-preferred security mechanisms. For example, UE 101 may present preferred security mechanisms (such as username/password, in this example) higher in user interface 401 than non-preferred or unavailable security mechanisms.

FIG. 4 provides an example user interface 401 in accordance with some embodiments. In some embodiments, other techniques may be used to present the available security mechanisms and/or the techniques in which security mechanisms are determined. For example, UE 101 may present icons in addition to, or in lieu of, text indicating available security mechanisms. Similarly, data structures 403 and 405 may maintain available security mechanism information in different ways. For example, data structure 405 may indicate security mechanisms which are not available by a particular enhanced authentication process and/or application. In such an instance, UE 101 may determine which security mechanisms are available by comparing what security mechanisms are available according to data structure 403 to the security mechanisms which are not available according to data structure 405. As a further example, data structures 403 and 405, while shown as single-column tables, may maintain additional information regarding the device and/or the application in one or more columns.

Figure 5:
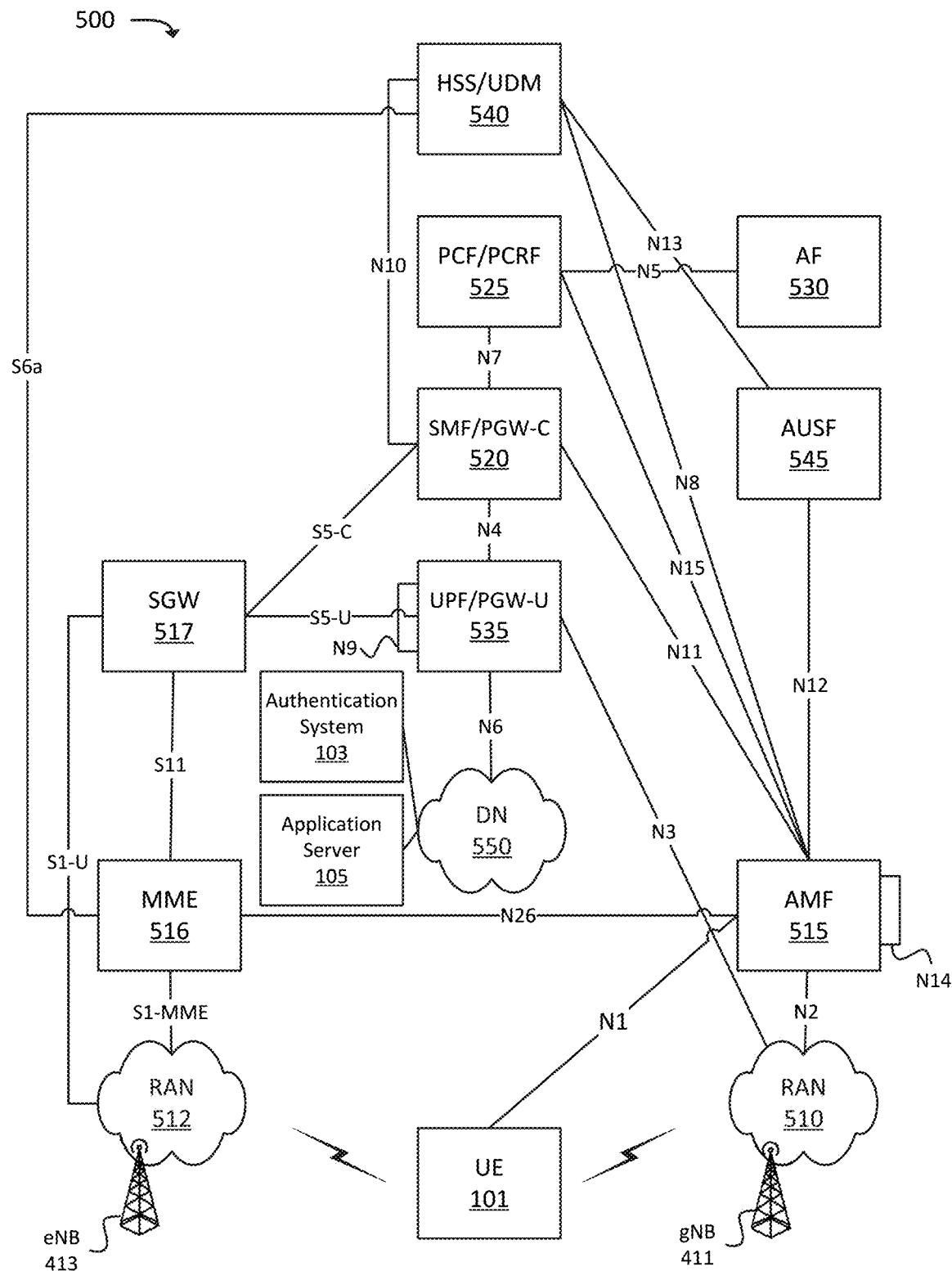
FIG. 5 illustrates an example environment in which one or more embodiments, described herein, may be implemented.

FIG. 5 illustrates an example environment 500, in which one or more embodiments may be implemented. In some embodiments, environment 500 may correspond to a Fifth Generation ("5G") network, and/or may include elements of a 5G network. In some embodiments, environment 500 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 500 may include UE 101, radio access network ("RAN") 510 (which may include one or more Next Generation Node Bs ("gNBs") 511), RAN 512 (which may include one or more one or more evolved Node Bs ("eNBs") 513), Access and Mobility Management Function ("AMF") 515, Mobility Management Entity ("MME") 516, Serving Gateway ("SGW") 517, Session Management Function ("SMF")/Packet Data Network ("PDN") Gateway ("PGW")-Control plane function ("PGW-C") 520, Policy Control Function ("PCF")/Policy Charging and Rules Function ("PCRF") 525, Application Function ("AF") 530, User Plane Function ("UPF")/PGW-User plane function ("PGW-U") 535, HSS/UDM 540, Authentication Server Function ("AUSF") 545, Data Network ("DN") 550, Authentication System 103, and Application Server 105.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 101 may include a computation and communication device, such as a wireless mobile communication device that is capable of communicating with RAN 510 and/or DN 550. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 101 may send traffic to and/or receive traffic (e.g., user plane traffic) from DN 550 via RAN 510 and UPF/PGW-U 535.

RAN 510 may be, or may include, a 5G RAN that includes one or more base stations (e.g., one or more gNBs 511), via which UE 101 may communicate with one or more other elements of environment 500. UE 101 may communicate with RAN 510 via an air interface (e.g., as provided by gNB 511). For instance, RAN 510 may receive traffic (e.g., voice call traffic, data traffic, messaging traffic, signaling traffic, etc.) from UE 101 via the air interface, and may communicate the traffic to UPF/PGW-U 535, and/or one or more other devices or networks. Similarly, RAN 510 may receive traffic intended for UE 101 (e.g., from UPF/PGW-U 535, AMF 515, and/or one or more other devices or networks) and may communicate the traffic to UE 101 via the air interface.

RAN 512 may be, or may include, an LTE RAN that includes one or more base stations (e.g., one or more eNBs 513), via which UE 101 may communicate with one or more other elements of environment 500. UE 101 may communicate with RAN 512 via an air interface (e.g., as provided by eNB 513). For instance, RAN 510 may receive traffic (e.g., voice call traffic, data traffic, messaging traffic, signaling traffic, etc.) from UE 101 via the air interface, and may communicate the traffic to UPF/PGW-U 535, and/or one or more other devices or networks. Similarly, RAN 510 may receive traffic intended for UE 101 (e.g., from UPF/PGW-U 535, SGW 517, and/or one or more other devices or networks) and may communicate the traffic to UE 101 via the air interface.

AMF 515 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, and/or to perform other operations. In some embodiments, the 5G network may include multiple AMFs 515, which communicate with each other via the N14 interface (denoted in FIG. 5 by the line marked "N14" originating and terminating at AMF 515).

MME 516 may include one or more devices, systems, VNFs, etc., that perform operations to register UE 501 with the EPC, to establish bearer channels associated with a session with UE 501, to hand off UE 501 from the EPC to another network, to hand off UE 501 from another network to the EPC, manage mobility of UE 501 between RANs 512 and/or eNBs 513, and/or to perform other operations.

SGW 517 may include one or more devices, systems, VNFs, etc., that aggregate traffic received from one or more eNBs 513 and send the aggregated traffic to an external network or device via UPF/PGW-U 535. Additionally, SGW 517 may aggregate traffic received from one or more UPF/PGW-Us 535 and may send the aggregated traffic to one or more eNBs 513. SGW 517 may operate as an anchor for the user plane during inter-eNB handovers and as an anchor for mobility between different telecommunication networks or RANs (e.g., RANs 510 and 512).

SMF/PGW-C 520 may include one or more devices, systems, VNFs, etc., that gather, process, store, and/or provide information in a manner described herein. SMF/PGW-C 520 may, for example, facilitate in the establishment of communication sessions on behalf of UE 101. In some embodiments, the establishment of communications sessions may be performed in accordance with one or more policies provided by PCF/PCRF 525.

PCF/PCRF 525 may include one or more devices, systems, VNFs, etc., that aggregate information to and from the 5G network and/or other sources. PCF/PCRF 525 may receive information regarding policies and/or subscriptions from one or more sources, such as subscriber databases and/or from one or more users (such as, for example, an administrator associated with PCF/PCRF 525).

AF 530 may include one or more devices, systems, VNFs, etc., that receive, store, and/or provide information that may be used in determining parameters (e.g., quality of service parameters, charging parameters, or the like) for certain applications.

UPF/PGW-U 535 may include one or more devices, systems, VNFs, etc., that receive, store, and/or provide data (e.g., user plane data). For example, UPF/PGW-U 535 may receive user plane data (e.g., voice call traffic, data traffic, etc.), destined for UE 101, from DN 550, and may forward the user plane data toward UE 101 (e.g., via RAN 510, SMF/PGW-C 520, and/or one or more other devices). In some embodiments, multiple UPFs 535 may be deployed (e.g., in different geographical locations), and the delivery of content to UE 101 may be coordinated via the N9 interface (e.g., as denoted in FIG. 5 by the line marked "N9" originating and terminating at UPF/PGW-U 535). Similarly, UPF/PGW-U 535 may receive traffic from UE 101 (e.g., via RAN 510, SMF/PGW-C 520, and/or one or more other devices), and may forward the traffic toward DN 550. In some embodiments, UPF/PGW-U 535 may communicate (e.g., via the N4 interface) with SMF/PGW-C 520, regarding user plane data processed by UPF/PGW-U 535.

HSS/UDM 540 and AUSF 545 may include one or more devices, systems, VNFs, etc., that manage, update, and/or store, in one or more memory devices associated with AUSF 545 and/or HSS/UDM 540, profile information associated with a subscriber. AUSF 545 and/or HSS/UDM 540 may perform authentication, authorization, and/or accounting operations associated with the subscriber and/or a communication session with UE 101.

DN 550 may include one or more wired and/or wireless networks. For example, DN 550 may include an Internet Protocol ("IP")-based PDN, a wide area network ("WAN") such as the Internet, a private enterprise network, and/or one or more other networks. UE 101 may communicate, through DN 550, with data servers, other UEs 101, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 101 may communicate.

Authentication System 103 may include one or more devices, systems, VNFs, etc., which facilitates the registration and authentication of UE 101 with various applications. As described herein, Authentication System 103 may communicate with UE 101, Application Server 105, and/or one or more devices and/or systems via DN 550. In some embodiments, Authentication System 103 may be communicatively coupled with and/or embedded in UE 101. In some embodiments, Authentication System may implement or may be communicatively coupled with Authentication System 103.

Application Server 105 may include one or more devices, systems, VNFs, etc., which provide information or content regarding applications to UE 101. While shown as communicatively coupled to DN 550, Application Server 105 may additionally, or alternatively, be implemented by one or more "edge" devices (e.g., MECs), which may be part of, or may be communicatively coupled to, UE 101 via RAN 510 or RAN 512 (e.g., not via DN 550). In some embodiments, Application Server 105 may maintain a repository of various authentication tokens and/or key sets corresponding to an application and/or UE 101. Application Server 105 may communicate with Authentication System 103 and/or one or more other devices through DN 550.

Figure 6:
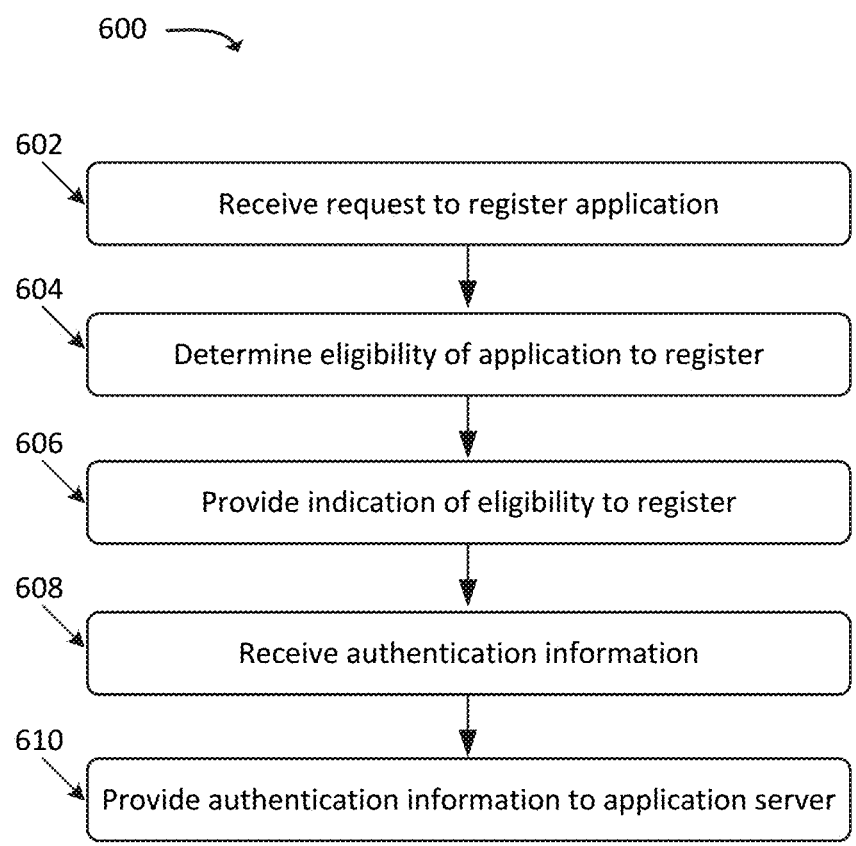
FIG. 6 illustrates an example process for registering an application to use a particular enhanced authentication process, in accordance with some embodiments.

FIG. 6 illustrates an example process 600 for registering a particular application with a particular UE 101. In some embodiments, some or all of process 600 may be performed by Authentication System 103. In some embodiments, one or more other devices may perform some or all of process 600 (e.g., in concert with, and/or in lieu of, Authentication System 103).

As shown, process 600 may include receiving (at 602) a request to register an application. As described above, for example, a user associated with UE 101 may provide a request to UE 101 to register an instance of a particular application for an enhanced authentication process (e.g., for a user-level, device-level, and application-level authentication process in accordance with some embodiments). The request may include, for example, attribute information regarding UE 101 (e.g., device manufacture, model, identifier, etc.), information regarding the user associated with UE 101 (e.g., name and/or other identifier, etc.), and/or information regarding the application to be registered (e.g., application identifier, etc.). As discussed above, in some embodiments, the request may include an application identifier, which may be utilized to validate the application.

Process 600 may additionally include determining (at 604) the eligibility of the particular application to register to utilize the enhanced authentication process. As described above, the eligibility may be determined, by requesting a list of authorized applications from Authentication Repository 107 and comparing the received application identifier (e.g., from 602) to the received list. In some embodiments, Authentication System 103 may query Application Server 105 to determine the security mechanisms which the particular application may utilize to register.

Process 600 may also include providing (at 606) an indication of the eligibility for UE 101 to register to utilize the enhanced authentication process. As described above, in some embodiments, the indication may include available security mechanisms which the application and/or enhanced authentication process may utilize.

Process 600 may further include receiving (at 608) authentication information, such as an identifier associated with the generated pair of public/private keys, a registered username (or other identifier) associated with the registration, and/or other information. In some embodiments, Authentication System 103 may receive an application identifier associated with the particular application. In some embodiments, Authentication System 103 may further receive information regarding a particular selected security mechanism utilized to generate the set of authentication keys.

Process 600 may additionally include providing (at 610) the received authentication information to Application Server 105, such as an identifier associated with the generated set of keys, an identifier associated with the registration, the application identifier, information regarding the particular security mechanism utilized to generate the key set, and/or other information.

Figure 7:
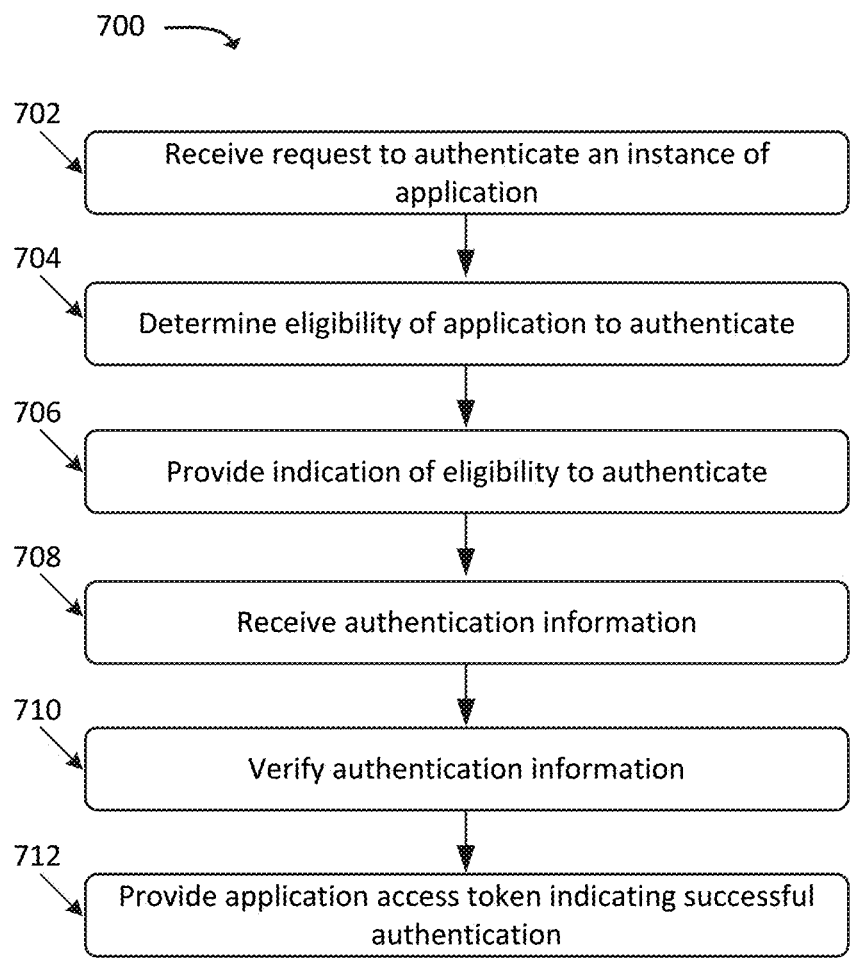
FIG. 7 illustrates an example process for authenticating an instance of an application, in accordance with some embodiments.

FIG. 7 illustrates an example process 700 for authenticating an instance of a particular application utilizing a particular enhanced authentication process. In some embodiments, some or all of process 700 may be performed by Authentication System 103. In some embodiments, one or more other devices may perform some or all of process Authentication System 103 (e.g., in concert with, and/or in lieu of, Authentication System 103).

As shown, process 700 may include receiving (at 702) a request to authenticate an instance of an application. An "instance" of an application may refer to a particular instance or installation of the application on a particular UE 101, where the same application installed on two UEs 101 may be referred to as two "instances" of the application. As described above, UE 101 may request to present information via the application, which may require authentication of a user of UE 101. In some embodiments, the request may include information regarding UE 101, the application instance that is requesting authentication, and/or other information pertinent to the authentication.

Process 700 may further include determining (at 704) whether the application is permitted to utilize the enhanced authentication process by comparing a received list of application identifiers to the received application identifier received as part of the request to authenticate (e.g., from 702). In some embodiments, Authentication System 103 may determine which security mechanisms are available to authenticate (e.g., which security mechanisms have been previously registered, etc.).

Process 700 may additionally include providing (at 706) an indication of the ability for a particular application to authenticate utilizing the enhanced authentication process. As discussed above, in some embodiments, the indication may be provided to UE 101, and may include available security mechanisms which may be utilized to authenticate a particular application.

Process 700 may also include receiving (at 708) authentication information, such as the security mechanism utilized to authenticate the instance of the application, an identifier associated with the public/private key pair, a signed challenge string, and/or other information. For example, as similarly described above, UE 101 may have received a selection of a particular security mechanism and may authenticate a user of UE 101 based on the particular security mechanism.

Process 700 may further include verifying (at 710) authentication information. For example, Authentication System 103 may compare the signed challenge string, provided during registration (e.g., as discussed above) with the authentication information received (at 708) from UE 101.

Process 700 may additionally include providing (at 712) an Application Access Token indicating a successful authentication. The Application Access Token may be signed (e.g., using a signing algorithm) by Authentication System 103, using the private key associated with Authentication System 103, which identifies a successful authentication. The token may be utilized, for example, by an application server (e.g., Application Server 105) associated with the application, to indicate that UE 101 was successful in authenticating a user of UE 101, and that Authentication System 103 has authenticated the UE 101 and the application (e.g., has performed user-level, device-level, and application-level authentication). Accordingly, Application Server 105 may begin communicating secure content with UE 101.

Figure 8:
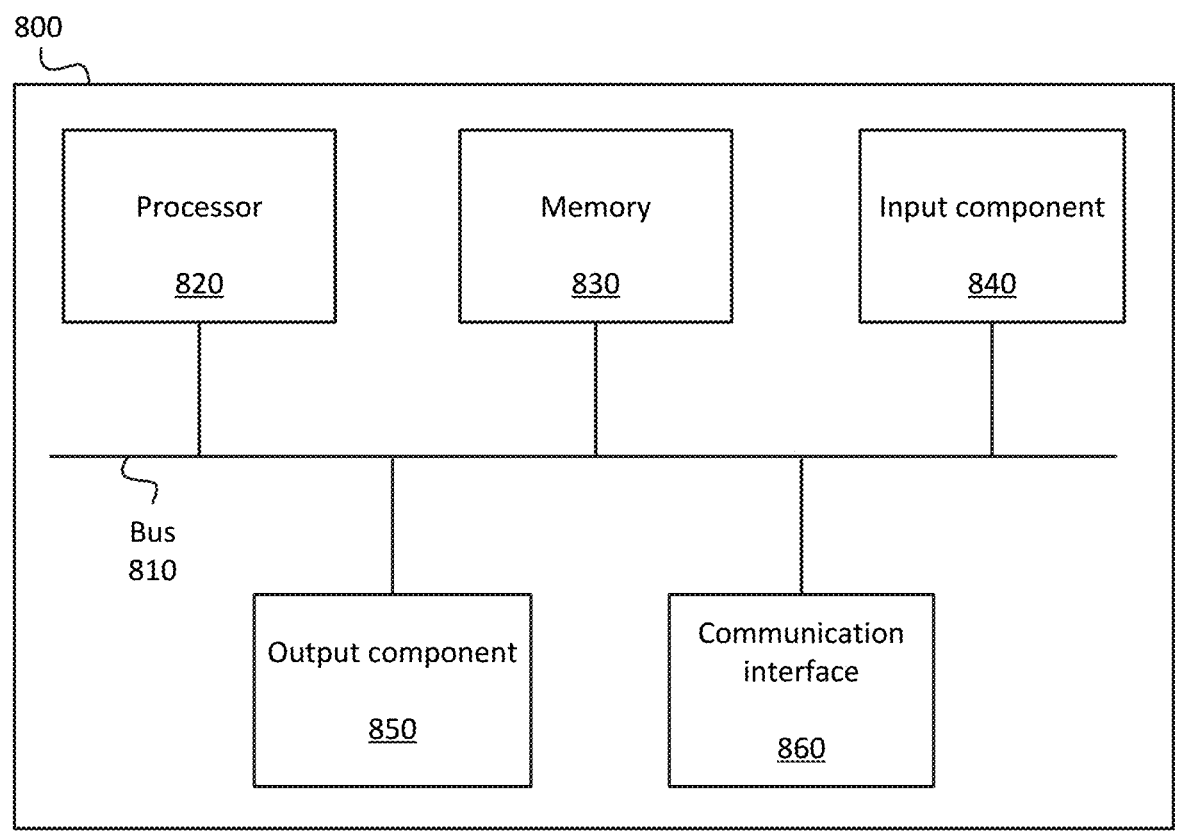
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-3, 6, and 7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a memory; and
   one or more processors configured to:
      receive, from a User Equipment ("UE"), a first request, wherein the first request includes an application identifier associated with a particular application executing on the UE;
      select a particular set of authentication mechanisms, from a plurality of candidate authentication mechanisms, based on the application identifier included in the first request;
      provide, to the UE, an indication of the selected particular set of authentication mechanisms;
      receive, from the UE, a public key that is associated with a public/private key pair generated by the UE, the public/private key pair being associated with a particular authentication mechanism, of the selected particular set of authentication mechanisms, implemented by the UE;
      receive, from the UE, a second request to access content associated with the particular application, the second request including the application identifier and a signed challenge that has been generated by using the private key associated with the public/private key pair based on the particular authentication mechanism being performed at the UE;
      verify the signed challenge using the public key associated with the public/private key pair;
      authenticate the particular application by comparing the application identifier, included in the second request, to the application identifier included in the first request; and
      output, to an application server associated with the particular application, an indication that the signed challenge has been verified and that the application has been authenticated.

2. The device of claim 1, wherein the public key is a first public key, wherein the private key is a first private key, and wherein the public/private key pair is first public/private key pair,
   wherein the first identifier is signed by a second private key of a second public/private key pair associated with the particular application,
   wherein authenticating the particular application includes using a second public key of the second public/private key pair to authenticate the application.

3. The device of claim 1, wherein the second request further includes a UE identifier associated with the UE, wherein the one or more processors are further configured to authenticate the UE based on the second identifier,
   wherein the indication output to the application server associated with the particular application further indicates that the UE has been authenticated.

4. The device of claim 3, wherein authenticating the UE based on the UE identifier includes determining that the UE identifier matches a previously stored UE identifier associated with the UE.

5. The device of claim 1, wherein the particular set of authentication mechanisms includes at least one of:
   a biometric authentication mechanism,
   a Personal Identification Number ("PIN") authentication mechanism, or
   a user name and password authentication mechanism.

6. The device of claim 1, wherein the first request further includes an indication of one or more authentication mechanisms implemented by the UE, wherein selecting the particular set of authentication mechanisms includes selecting from the indicated one or more authentication mechanisms implemented by the UE.

7. The device of claim 1, wherein the particular application presents, via the UE, the selected particular set of authentication mechanisms and a user-selectable option to select a particular authentication mechanism of the selected particular set of authentication mechanisms.

8. A non-transitory computer-readable medium, storing a plurality of processor-executable instructions to:
   receive, from a User Equipment ("UE"), a first request, wherein the first request includes an application identifier associated with a particular application executing on the UE;
   select a particular set of authentication mechanisms, from a plurality of candidate authentication mechanisms, based on the application identifier included in the first request;
   provide, to the UE, an indication of the selected particular set of authentication mechanisms;
   receive, from the UE, a public key that is associated with a public/private key pair generated by the UE, the public/private key pair being associated with a particular authentication mechanism, of the selected particular set of authentication mechanisms, implemented by the UE;
   receive, from the UE, a second request to access content associated with the particular application, the second request including the application identifier and a signed challenge that has been generated by using the private key associated with the public/private key pair based on the particular authentication mechanism being performed at the UE;
   verify the signed challenge using the public key associated with the public/private key pair;
   authenticate the particular application by comparing the application identifier, included in the second request, to the application identifier included in the first request; and output, to an application server associated with the particular application, an indication that the signed challenge has been verified and that the application has been authenticated.

9. The non-transitory computer-readable medium of claim 8, wherein the public key is a first public key, wherein the private key is a first private key, and wherein the public/private key pair is first public/private key pair,
wherein the first identifier is signed by a second private key of a second public/private key pair associated with the particular application,
wherein authenticating the particular application includes using a second public key of the second public/private key pair to authenticate the application.

10. The non-transitory computer-readable medium of claim 8, wherein the second request further includes a UE identifier associated with the UE, wherein the plurality of processor-executable instructions further include processor-executable instructions to authenticate the UE based on the second identifier,
wherein the indication output to the application server associated with the particular application further indicates that the UE has been authenticated.

11. The non-transitory computer-readable medium of claim 10, wherein authenticating the UE based on the UE identifier includes determining that the UE identifier matches a previously stored UE identifier associated with the UE.

12. The non-transitory computer-readable medium of claim 8, wherein the particular set of authentication mechanisms includes at least one of:
a biometric authentication mechanism,
a Personal Identification Number ("PIN") authentication mechanism, or
a user name and password authentication mechanism.

13. The non-transitory computer-readable medium of claim 8, wherein the first request further includes an indication of one or more authentication mechanisms implemented by the UE, wherein selecting the particular set of authentication mechanisms includes selecting from the indicated one or more authentication mechanisms implemented by the UE.

14. The non-transitory computer-readable medium of claim 8, wherein the particular application presents, via the UE, the selected particular set of authentication mechanisms and a user-selectable option to select a particular authentication mechanism of the selected particular set of authentication mechanisms.

15. A method, comprising:
receiving, from a User Equipment ("UE"), a first request, wherein the first request includes an application identifier associated with a particular application executing on the UE;
selecting a particular set of authentication mechanisms, from a plurality of candidate authentication mechanisms, based on the application identifier included in the first request;
providing, to the UE, an indication of the selected particular set of authentication mechanisms;
receiving, from the UE, a public key that is associated with a public/private key pair generated by the UE, the public/private key pair being associated with a particular authentication mechanism, of the selected particular set of authentication mechanisms, implemented by the UE;
receiving, from the UE, a second request to access content associated with the particular application, the second request including the application identifier and a signed challenge that has been generated by using the private key associated with the public/private key pair based on the particular authentication mechanism being performed at the UE;
verifying the signed challenge using the public key associated with the public/private key pair;
authenticating the particular application by comparing the application identifier, included in the second request, to the application identifier included in the first request; and
outputting, to an application server associated with the particular application, an indication that the signed challenge has been verified and that the application has been authenticated.

16. The method of claim 15, wherein the public key is a first public key, wherein the private key is a first private key, and wherein the public/private key pair is first public/private key pair,
wherein the first identifier is signed by a second private key of a second public/private key pair associated with the particular application,
wherein authenticating the particular application includes using a second public key of the second public/private key pair to authenticate the application.

17. The method of claim 15, wherein the second request further includes a UE identifier associated with the UE, the method further comprising authenticating the UE based on the second identifier,
wherein authenticating the UE based on the UE identifier includes determining that the UE identifier matches a previously stored UE identifier associated with the UE,
wherein the indication output to the application server associated with the particular application further indicates that the UE has been authenticated.

18. The method of claim 15, wherein the particular set of authentication mechanisms includes at least one of:
a biometric authentication mechanism,
a Personal Identification Number ("PIN") authentication mechanism, or
a user name and password authentication mechanism.

19. The method of claim 15, wherein the first request further includes an indication of one or more authentication mechanisms implemented by the UE, wherein selecting the particular set of authentication mechanisms includes selecting from the indicated one or more authentication mechanisms implemented by the UE.

20. The method of claim 15, wherein the particular application presents, via the UE, the selected particular set of authentication mechanisms and a user-selectable option to select a particular authentication mechanism of the selected particular set of authentication mechanisms.

* * * * *